(12) United States Patent
Byrnes et al.

(10) Patent No.: US 7,984,709 B1
(45) Date of Patent: Jul. 26, 2011

(54) VENT CONTROL FOR GRILL

(75) Inventors: Terrence P. Byrnes, Mound, MN (US);
Carlos E. Rodriguez, Woodbury, MN (US); Han Yong Tang, Linhai (CN)

(73) Assignee: Vendor Development Group, Inc., Minneapolis, MN (US)

(*) Notice: Subject to any disclaimer, the term of this patent is extended or adjusted under 35 U.S.C. 154(b) by 116 days.

(21) Appl. No.: 12/568,100

(22) Filed: Sep. 28, 2009

(51) Int. Cl.
*F24C 3/00* (2006.01)
(52) U.S. Cl. ............ 126/250; 126/290; 126/285 A; 126/25 R
(58) Field of Classification Search .......... 126/250, 126/290, 285 A, 112, 15 R, 21 R, 80, 163 R, 126/153, 25 R
See application file for complete search history.

(56) References Cited

U.S. PATENT DOCUMENTS

| | | | | |
|---|---|---|---|---|
| 3,396,715 A | * | 8/1968 | Allen | 126/25 B |
| 4,719,899 A | * | 1/1988 | Burkhart | 126/163 R |
| 2007/0277800 A1 | * | 12/2007 | Chiang | 126/25 R |

* cited by examiner

*Primary Examiner* — Alfred Basichas
(74) *Attorney, Agent, or Firm* — Moore & Hansen, PLLP

(57) ABSTRACT

A vent control for a grill. The vent control includes a panel and an actuator that is operatively connected to and which is able to move the panel so that it can control the draft of the grill. The operative connection between the panel and the apparatus includes interengagable teeth. The vent control is attached to a grill so that the panel is located adjacent a surface of the grill and the actuator protrudes through a hole in the grill and is manipulable by way of a control knob. In use, the panel is moved by the actuator so that it is able to regulate the draft of the grill. Preferably, the actuator includes a shaft that is provided with a drive member in the form of a toothed gear, while the panel includes a toothed rail or rack that is engagable with the drive member.

20 Claims, 4 Drawing Sheets

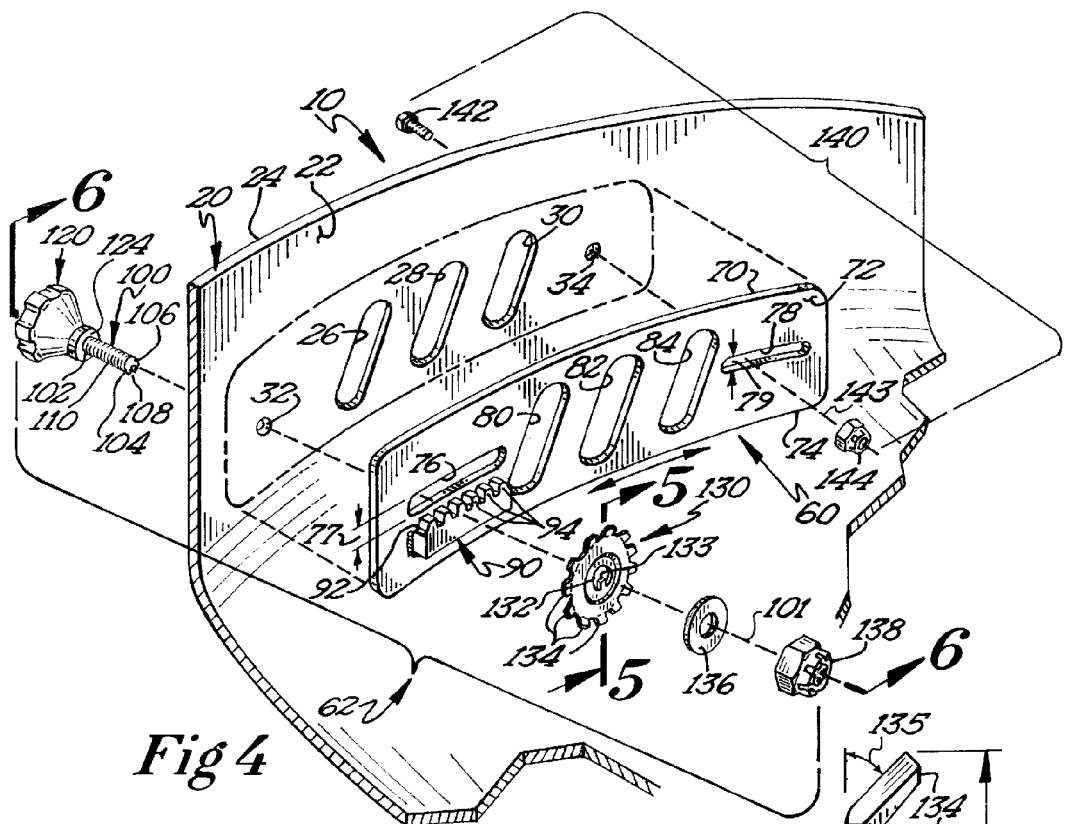
Fig 4
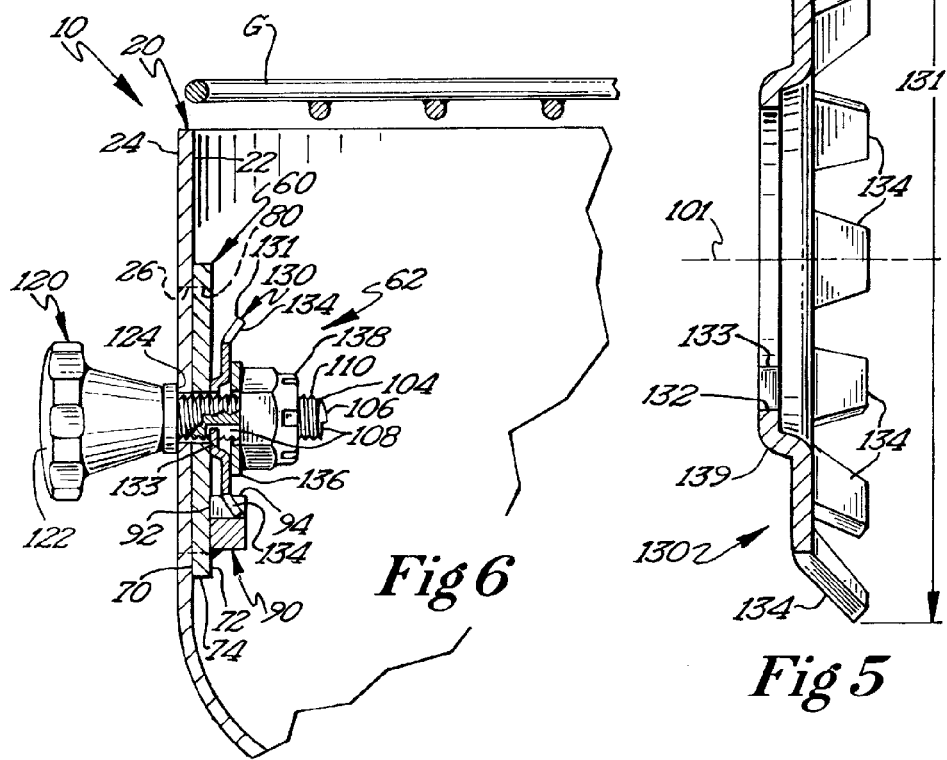
Fig 6
Fig 5

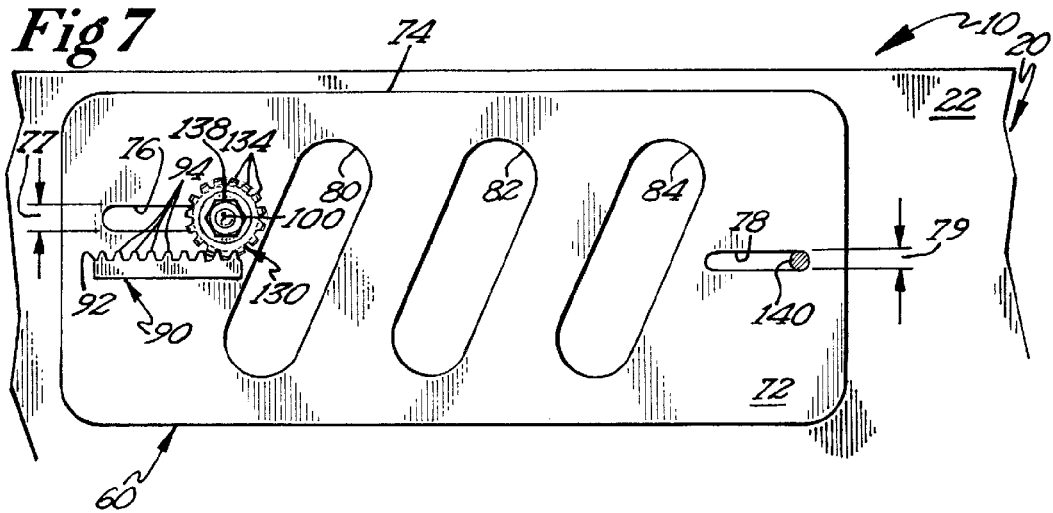
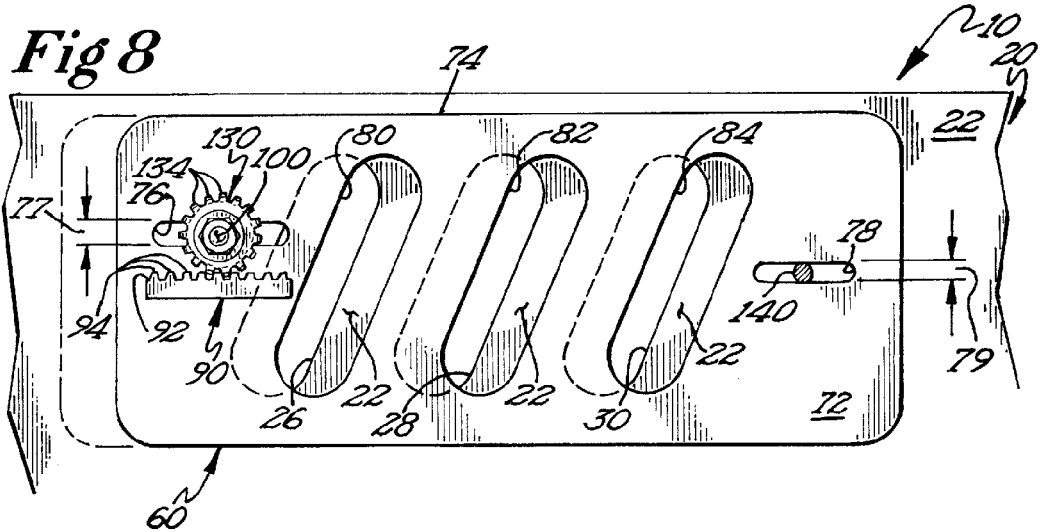
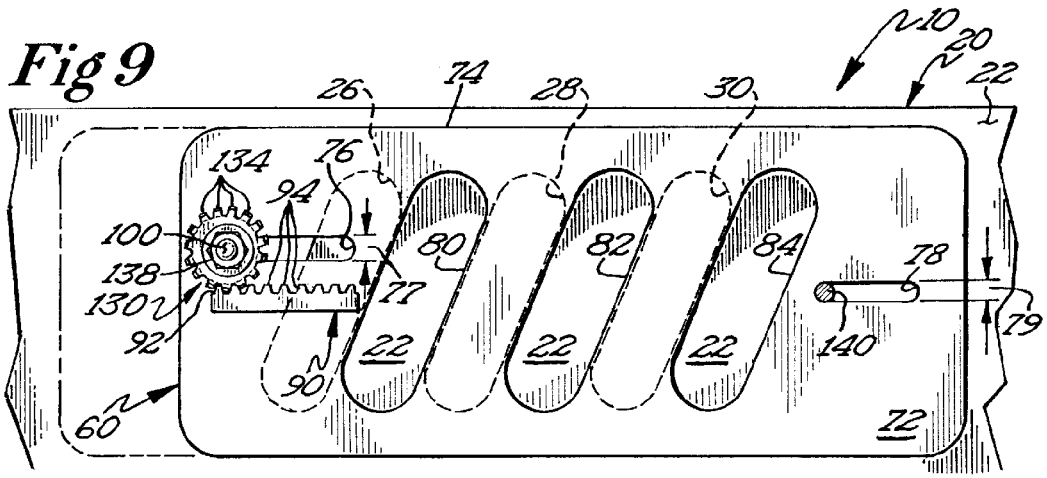

VENT CONTROL FOR GRILL

BACKGROUND

This application relates generally to cooking appliances. More particularly, this application relates to outdoor cooking appliances and even more particularly, to venting for outdoor grills.

Outdoor cooking is a very common and enjoyable way of preparing meals. The practice goes back many thousands of years. From a simple campfire, various devices have been developed that increase the outdoor cooking experience. One modern innovation that has been developed is that of a grill that includes a base or lower section with a fuel holding section and a grate that is positionable over the fuel holding section. Many of such cooking appliances are often provided with a cover that may be movably positioned over the lower section and the grate so as to define a cooking enclosure or chamber.

In order to enable a combustible fuel source to burn effectively, such appliances are usually provided with one or more apertures through which a draft can be initiated and maintained. A further development involves control of the draft. Control of the draft (and the temperature of the cooking appliance) is achieved by providing the cooking appliance with a controllable vent. Such controllable vents usually take the form of a disc of stamped aluminum with an upwardly extending tab. The typical vent often has its disc rotatably attached at on exterior wall of the cooking appliance and includes holes that can be positioned to coincide with apertures in the wall of the cooking appliance.

A drawback with such vents is that the tab that is used to manipulate the damper is often small and hard to grasp. In addition, the tab tends to become dangerously hot because of the high thermal conductivity of the base material. A related drawback associated with such vents is that the tab is in close proximity to the exhaust airflow that flows through the vent, which can also be dangerously hot and can easily burn the fingers of a user who is trying to adjust the vent. Another related drawback associated with such vents is that they are located adjacent the surfaces of the cooking appliance, which can itself become very hot. If a user does not continuously exercise caution, the user may inadvertently touch or brush up against the hot exterior surface of the cooking appliance while trying to adjust the vent—resulting in painful burns. Often, a user cannot manipulate the vent with any precision due to its high temperature and the result is imperfectly cooked food.

The location of such prior art vents also has drawbacks. Often, the cooking appliance is left outdoors and the vents are exposed to the elements. And, because they are usually fabricated from material that is not protectively coated or which is not as durable as the other components of the grill, they tend to rust, wear out or oxidize before the rest of the grill. In addition, the exposed tabs are more subject to wear and tear, and they can be easily bent over and become quite difficult and dangerous to grip. It is not uncommon for a tab to break off and a user must improvise by using hand tools or other objects to manipulate and adjust the vent. Such vents are also susceptible to grime and pollutants that can infiltrate between the movable portion and the cooking apparatus surfaces and interfere with the normal operation of the vent. This can cause the vent to freeze in position or become difficult to adjust, resulting in a less enjoyable cooking experience.

The vent control of this application overcomes drawbacks associated with existing prior art grill vents. It is easy to operate, allows precise positioning, and significantly reduces the risk of accidental contact with hot surfaces and exposure to superheated air flow.

SUMMARY

In one embodiment, a vent control for controlling the draft of an outdoor cooking appliance includes a panel and an actuator that is operatively connected to the panel. Preferably, the panel is located adjacent an inner surface of a wall segment of a cooking appliance body, and is movably connected thereto. The actuator, which includes a shaft, is rotatably connected to the wall segment of the body of the grill such that the shaft is oriented generally transverse thereto, and portions of the shaft protrude or extend inwardly and outwardly from the wall segment.

The panel and the actuator of the vent control are operatively connected to each other such that when the shaft is rotated, the panel is moved. As the panel is moved by the actuator, it can be positioned so that it can selectively allow free flow, block, restrict, or otherwise control the flow of air into and out of the cooking appliance.

DESCRIPTION OF THE DRAWINGS

FIG. 4 is a partial, exploded, perspective view of a vent control and a cooking appliance, with the view taken from the interior of the cooking appliance;

FIG. 5 is a cross-sectional view of the drive member of the vent control of FIG. 4 taken along cutting plane 5-5 of FIG. 4;

FIG. 6 is a partial, cross-sectional, elevational view of the vent control of FIG. 4 taken along cutting plane 6-6 of FIG. 4;

FIG. 7 is an elevational view of the vent control of FIG. 4, with the vent control in a first position;

FIG. 8 is an elevational view of the vent control of FIG. 4, with the vent control in a second position; and, FIG. 9 is an elevational view of the vent control of FIG. 4, with the vent control in a third position.

DETAILED DESCRIPTION

Figure 1:
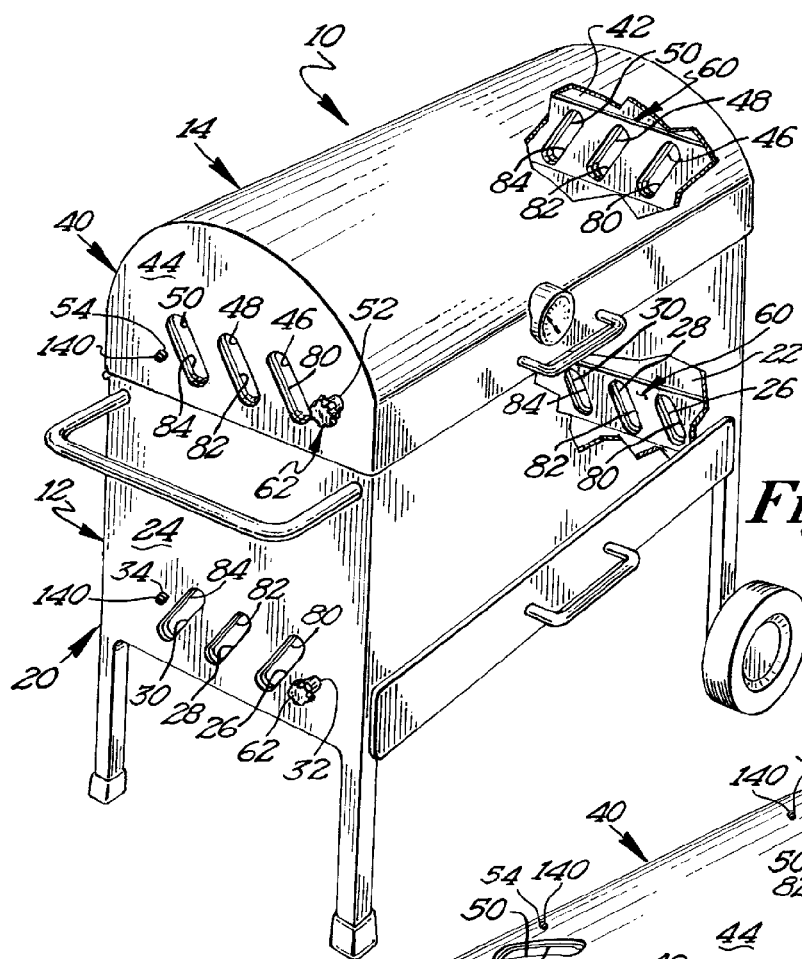
FIG. 1 is a perspective view of an embodiment of the vent control in conjunction with an outdoor cooking appliance.
Figure 2:
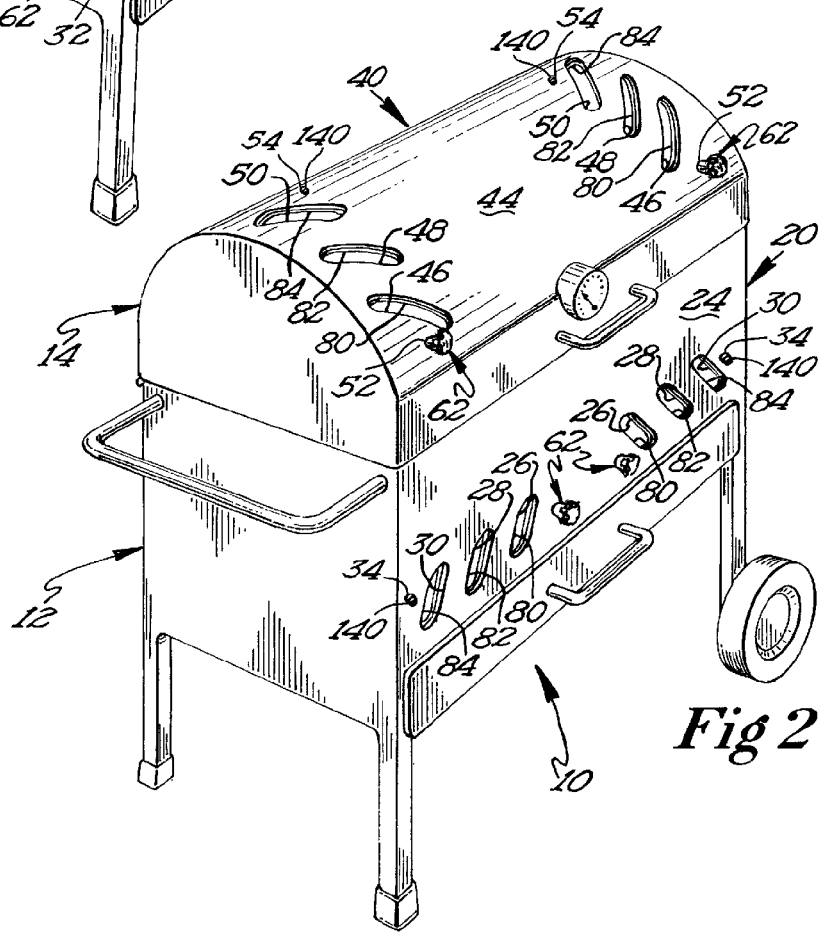
FIG. 2 is a perspective view of a second embodiment of the vent control shown with the cooking appliance of FIG. 1.
Figure 3:
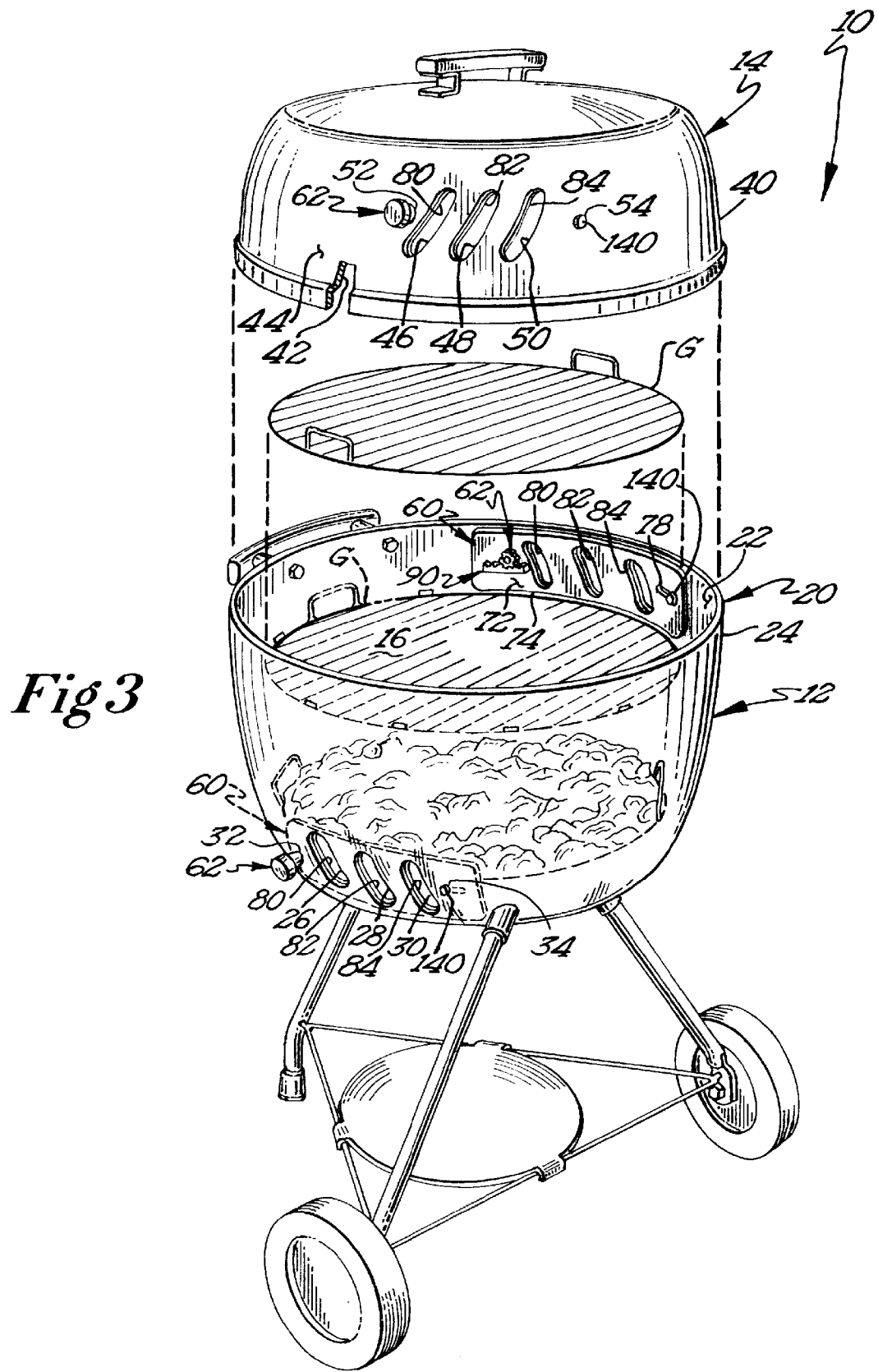
FIG. 3 is a perspective view of a cooking appliance with a third embodiment of a vent control.

Outdoor cooking appliances or grills 10 that are used in conjunction with an embodiment of a vent control are illustrated in FIGS. 1-3. Generally, the outdoor cooking appliance or grill is of the type having a lower section 12 with wall 20 having an inner surface 22 (not shown in FIG. 2) and an outer surface 24, and with the wall 20 defining an open top that receives a cooking grate G, as best shown in FIG. 3. The lower section 12, which houses a heat source comprising combustible fuel such as firewood, briquettes, charcoal, gas or the like, may include one or more venting apertures 26, 28, 30 through which air can be drawn to form convection currents and to assist in the combustion of fuel. The cooking appliance or grill 10 may include an upper section 14 that includes a wall 40 having an inner surface 42 (not shown in FIG. 2) and an outer surface 44, and with the wall 40 defining an open bottom that is sized to effectively cover the open top of the lower section 12 so that the upper and lower sections 14, 12 can be combined to form a cooking chamber with an interior 16. As with the lower section 12, the upper section 14 may include one or more venting apertures 46, 48, 50 through which air can be drawn. As will be appreciated, the cooking apparatus or grill may take other forms without departing from the spirit and intent of this application.

An embodiment of a vent control is illustrated in FIGS. 4-9. As depicted, the embodiment of the vent control comprises a movable panel 60 and a rotatable actuator 62. The panel 60 is generally thin and includes a first surface 70, a second surface 72 and a perimeter or edge 74. The panel may be flat or slightly curved as shown in FIG. 4 so as to follow the contour of the inner surface 22 of wall 20. The actuator 62 includes a shaft 100 with a first end 102 and a second end 104, with the second end having a threaded tip 106 and a keyway that engages a spline of a drive member 130.

More specifically, the panel 60 comprises a sheet of metallic, heat resistant material. The panel 60 is smaller than the section of the cooking appliance to which it is connected, but large enough to be able to be moved so as to prevent the flow of air through apertures 26, 28, 30 of the lower section 12 and/or apertures 46, 48, 50 of the upper section 14 of the grill 10. The panel 60 is preferably rectangularly shaped and includes a perimeter 74 with a plurality of side edges. The panel 60 may be provided with one or more openings or through holes 80, 82, 84 that are preferably approximately the same size and configuration as the air inlet apertures 26, 28, 30 and outlet apertures 46, 48, 50 of the lower 12 and upper 14 sections, respectively, of the cooking appliance or grill 10. The panel 60 is preferably positioned so that the first surface 70 of the panel is adjacent the inner surfaces 22, 42, of the lower and upper sections 12, 14, respectively, of the cooking appliance 10 and is movably retained thereagainst. It has been discovered that an unexpected benefit of positioning the panel 60 in the interior of the cooking appliance and adjacent the interior surfaces 22, 42, is that the air currents developed during the process of cooking tend to leave deposits of aerosolized fats and combustion byproducts on the panel 60 and interior surfaces 22, 42 of the grill, and these deposits serve as lubricants for the moving parts of the vent control. Moreover, it is believed that another unexpected benefit is that the lubricants also serve to inhibit corrosion of the components of the vent control.

The panel 60 is movably connected to the grill 10 by way of a plurality of apertures 76, 78 and fastening elements. Note that the panel is configured to match the surface of the grill to which it is connected. Thus, for example, the panel may be substantially planar as in FIG. 1 or it may be curved or arced as in FIG. 3. In one embodiment, the panel 60 is provided with two spaced-apart apertures in the form of slots 76, 78 with each slot having spaced-apart, parallel sides having widths 77, 79 that freely admit portions of fastening elements between their sides and along their lengths. The fastening elements, which will be discussed later, serve to retain and guide the panel 60 as it moves relative to a wall of the cooking appliance 10.

The panel 60 operatively connected to the actuator 62 by a rail or rack 90 that is offset relative to the plane of panel 60, and which is engaged by a drive member or pinion gear 130. More specifically, the rail or rack 90 includes an upper edge 92 with a plurality of interengagable elements or teeth 94 that are configured to mesh with interengagable elements or teeth 134 of drive member or pinion gear 130. The teeth 94 of the rail 90 are in close proximity to the first slot 76 of the panel and are parallel to the longitudinal axis of the first slot 76. As depicted, the first slot 76 is generally linear, however, it will be understood that the first slot 76 may be non-linear without departing from the spirit and scope of the invention. For example, the first slot and the teeth of the rail or rack may be arcuate and parallel. Preferably, the rail is integrally formed with the panel. However, the rail can be formed separately and attached to the panel by welding or soldering. Alternatively, it is envisioned that the panel could be modified so that one of the longitudinal sides of the slot 76 incorporates the teeth of the rail to form a toothed slot where the teeth lie within the plane of the panel 60. With such an arrangement, the shaft could be modified so that it is able to engage the teeth of the toothed slot directly.

Generally, the actuator 62, as best shown in FIGS. 4-6, comprises a shaft 100, a control knob or handle 120, and the drive member or pinion gear 130. More specifically, the shaft 100 comprises steel or a similar heat resistant material and has a diameter of approximately 0.25 inches (0.64 cm) and a length of approximately ½ inches (1.27 cm). The shaft 100, which has a longitudinal axis 101, includes a first end 102, a middle section and a second end 104. The shaft 100 is configured and arranged to be partially inserted into an aperture 32, 52 located in the wall 20, 40 of the lower 12 and/or upper 14 sections, respectively, of the cooking appliance 10. Each aperture 32, 52 is sized to permit rotation of the shaft 100 as the middle portion resides in a respective aperture. The first end 102 of the shaft 100 is configured and arranged to be operatively connected to a control knob or handle 120 that is preferably formed from high temperature plastic resin, thermosetting resin such as Bakelite®, or similar material that can resist heat generated by the grill. Thermosetting resin is preferred because it has a relatively low coefficient of thermal conductivity. As depicted, the knob or handle 120 includes a user end 122 and an engagement surface 124. The user end 122 is spaced from the engagement surface 124 by approximately 1 inch (2.54 cm) and includes an enlarged end with grip enhancing elements, preferably in the form of lugs. The engagement surface 124 is configured and arranged to slidingly contact the outer surface 24, 44 of the wall 20, 40 of the lower and/or upper section. The engagement surface 124 has a diameter that is greater than the diameter of the aperture 32, 52 so that it may function as part of one of the fastening elements that retains the panel 60 to the grill 10. Although not shown, a washer may be interposed between the engagement surface 124 and the outer surface 24, 44 of the lower/upper section of the grill. Preferably, the control handle or knob is attached to the shaft 100 by molding. It will be understood, however, that the knob or handle may be connected to the shaft in other ways without departing from the spirit and scope of the invention. For example, the control knob or handle may include an aperture that receives the first end of the shaft and the knob can include a transverse set screw that engages the first end of the shaft. Alternatively, the knob and the first end of the shaft can have splines that engage each other as the knob is press-fitted onto the first end of the shaft.

The second end 104 of the shaft 100 is configured and arranged to be operatively connected to the drive member such as a pinion gear 130 having interengagable elements or teeth 134. Preferably, the second end 104 includes a keyway or slot 108 that can be engaged by an appropriately configured spline or flange 133 that extends radially inwardly from the periphery of a center hole 132 of the pinion gear 130. The second end 104 also includes a tip 106 with a thread 110 that receives a threaded castellated nut 138. The castellated nut 138 is secured to the shaft 110 in the normal fashion; for example, by inserting a cotter pin or wire between adjacent crenellations and through a transverse through hole in the shaft (cotter pin and transverse through hole not shown). The castellated nut 138 is preferred because it removably secures the pinion gear 130 to the shaft 100. However, other types of locking nuts may be used without departing from the spirit and scope of the invention. As depicted, washer 136 is interposed between the castellated nut 138 and the pinion gear 130. However, the washer may be omitted, if desired. Preferably, the pinion gear 130 has a diameter 131 (FIG. 5) that is greater than the width 77 of the first slot 76 (FIG. 4). This allows the pinion gear 130 to function as part of one of the fastening elements that retains the panel 60 to the grill 10. To that end, the pinion gear may include a raised section or boss 139 that slidingly engages the panel as it moves, and which positions the interengagable elements or teeth 134 relative to the interengagable elements of the rail 90 for optimum operation. An additional positioning feature of the pinion gear 130 is to angle the teeth 134 relative to the plane of the pinion gear 130. Preferably, the angle 135 that the teeth 134 make relative to the pinion gear 130 is in the range of approximately 30-50 degrees. If the pinion gear 130 includes a raised section or boss 139, it is preferred that the raised section or boss has a diameter that is greater than the width 77 of the first slot 76. Together, the control knob, the shaft and the pinion gear and the castellated nut form a first fastening element.

A second fastening element 140 is in the form of a threaded bolt 142 with a middle section, a longitudinal axis 143, a threaded end and a castellated nut 144. As with the first fastening element, the bolt 142 is configured and arranged to be partially inserted into an aperture 34, 54 located in the lower 12 and/or upper 14 sections, respectively, of the cooking appliance 10. The bolt 142 of the fastening element 140 is provided with an enlarged head that has a diameter that is larger than the diameter of the aperture 34, 54 into which the pin is inserted. The middle section of the bolt 142 has a width or diameter that is smaller than the width 79 of the second slot 78 of panel 60, and is freely admitted by the second slot 78 of panel 60. The second component of the fastening element 140 is a castellated nut 144. The castellated nut 144 is secured to the bolt 142 in the normal fashion; for example, by inserting a cotter pin or wire between adjacent crenellations and through a transverse through hole in the shaft (cotter pin and transverse through hole not shown). The castellated nut 144 is preferred because it removably secures the bolt 142 and the panel 60 to the wall of the grill. It will be understood, however, that other types of fastening elements maybe used without departing from the spirit and scope of the invention. For example, the fastening element may take the form of two sections that are frictionally held together in a telescopic fashion. Alternatively, the aperture 34, 54 may be omitted and the fastening element may take the form of a threaded post that is welded or soldered to the interior surface of the wall of the grill, and a castellated nut that engages the threaded post. A comparable alternative may include one or more L-shaped tabs that are welded or soldered to the interior surface of the wall of the grill, and which slidingly receive portions of the panel. An additional comparable alternative may comprise a rivet.

In operation, the vent control is attached to a cooking appliance or grill so that the panel 60 is located in close proximity to the air inlet and/or air outlet apertures. The actuator control knob 120, which is operatively connected to the panel 60 via interengagable elements 134 and 94, respectively, moves the panel 60 to control the amount of air that flows through respective air inlet or outlet apertures. As best shown in FIGS. 7-9, the vent control is able to move from a first, or open, position to a second, intermediate position, and to a third, closed position. In FIG. 7, the panel 60 is positioned so that the air passages 80, 82, 84 are in registry with the air inlet apertures 26, 28, 30 of lower section 12. In this position, air can freely move through the air inlet apertures 26, 28, 30. When a user turns the actuator 62 so that the pinion gear 130, as depicted in FIG. 7, moves counterclockwise, the teeth 134 of the pinion gear 130 engage the teeth 94 of the rail 90 and the rail is driven to the right. The panel 60, which is connected to the rail, also moves to the right, and the motion of the panel 60 is constrained or guided by the interaction between the slots 76 and 78 as they slide transversely along shaft 100 and bolt 142, respectively. In FIG. 8, the panel 60 has been moved to a second or intermediate position where the air passages 80, 82, 84 are skewed relative to the air inlet apertures 26, 28, 30 of the lower section 12. In this position, air movement through the air inlet apertures 26, 28, 30 is restricted by approximately 50 percent. If the user continues to turn the actuator in the same counterclockwise direction, the teeth 134 of the pinion gear 130 will continue to engage teeth 94 of the rail 90 and continue to drive the rail 90 and the panel 60 attached thereto, to the right. Motion of the panel 60 continues to be constrained or guided by the interaction between the slots 76 and 78 as they slide transversely along shaft 100 and bolt 142, respectively. In FIG. 9, the panel 60 has been moved to the closed position where air passages 80, 82, 84 are covered by the wall 20, and where air inlet apertures 26, 28, 30 are covered by panel 60. In this position, air flow through the air inlet apertures 26, 28, 30 is essentially blocked completely.

As will be appreciated, the vent control allows the air flow or draft of a cooking appliance to be controlled from a position that is remote from the air inlet and outlet apertures, away from hot surfaces of the grill and away from superheated air that flows from the grill vents. The control knob, by virtue of its low thermal conductivity and configuration further isolates a user from high temperatures. Most of the components of the vent control are located in a protected position away from the elements such as rain and snow. As will be appreciated, a cooking appliance may be provided with a plurality of vent controls. For example, each of the lower and/or upper sections of a cooking appliance may be provided with two or more vent controls. In addition, a cooking appliance may be provided with differently configured air inlet apertures, air outlet apertures and panels. For example, there could be less or more air inlet and/or air outlet apertures than the groups of three apertures depicted in the figures. For example, the air inlet and/or air outlet apertures could be circular, triangular, oval, square, or otherwise polygonally shaped. The apertures in the panels can be similarly configured. Moreover, it will be understood that in the panels need not include apertures in order to regulate the flow of air through a grill. For example, a panel may mounted so that it is offset from the air inlet or air outlet apertures, and the panel may be provided with a non-apertured extension that is able to cover or uncover the apertures as the vent control is manipulated by a user.

The foregoing is considered as illustrative only. Furthermore, since numerous modifications and changes will readily occur to those skilled in the art, the exact construction and operation shown and described is only an example of a preferred embodiment. The invention is defined by the following claims.

What is claimed is:

1. A vent control for an outdoor grill having a lower section with an air inlet aperture, the lower section capable of receiving a heat source, and an upper cover section with an air outlet aperture, the vent control comprising:

a panel located adjacent an inner surface of at least one of said lower or upper sections of the outdoor grill, said panel movable relative to a respective one of either said air inlet or outlet apertures, with said panel selectively positionable so that it may control the amount of air that flows through said respective air inlet or outlet apertures by covering or uncovering the inlet or outlet aperture; and an actuator, said actuator movably attached to the respective one of either said lower or upper sections of the outdoor grill, said actuator having a rotatable shaft with a first end and a second end, with the first end extending outwardly away from an outer surface of the respective lower or upper sections of the outdoor grill, and with the second end extending inwardly away from the inner surface of the respective lower or upper sections of the outdoor grill, said second end of said actuator configured and arranged to engage and move said panel so that it may cover or uncover the inlet or outlet aperture.

2. The vent control of claim 1, wherein said second end of said shaft includes a drive member, and wherein said drive member engages a portion of said panel.

3. The vent control of claim 2, wherein said drive member engages a rack that is connected to the panel.

4. The vent control of claim 2, wherein said drive member and said rack include interengagable elements.

5. The vent control of claim 4, wherein the interengagable elements of said rack are arranged in a substantially linear fashion.

6. The vent control claim 1, wherein a portion of the shaft of said actuator extends into a first slot in said panel, and wherein said first slot constrainingly guides the panel as it is moved by the actuator.

7. The vent control of claim 6, wherein said first slot is substantially linear.

8. The vent control of claim 1, wherein said actuator operatively connects said panel to respective lower or upper sections of the outdoor grill.

9. The vent control of claim 6, wherein said panel includes a second slot, with the second slot configured and arranged to slidably receive a retaining pin that is attached to one of the respective lower or upper sections of the outdoor grill.

10. The vent control of claim 1, wherein said panel includes at least one aperture that is substantially the same size and shape of said air inlet or outlet aperture of said outdoor grill.

11. The vent control of claim 1, wherein said panel is constrained to move in a substantially linear direction.

12. The vent control of claim 1, further comprising a handle removably connected to the first end of the shaft.

13. The vent control of claim 12, wherein the handle comprises material of low thermal conductivity.

14. A vent control for an outdoor grill of the type having a lower section with a heat source and an air inlet aperture, the vent control comprising:
 a panel located adjacent an inner surface of said lower section of the outdoor grill, said panel movable relative to said air inlet aperture, with said panel selectively positionable so that it may control the amount of air that flows through said air inlet aperture by covering or uncovering the air inlet aperture; and
 an actuator, said actuator movably attached to said lower section of the outdoor grill, said actuator having a rotatable shaft with a first end and a second end, with the first end extending outwardly away from an outer surface of said lower section of the outdoor grill, and with the second end extending inwardly away from the inner surface and towards the interior of the outdoor grill, said second end of said actuator configured and arranged to engage and move said panel so that it may cover or uncover the air inlet aperture.

15. The vent control of claim 14, wherein said panel includes a first slot, and wherein said first slot slideably engages a portion of said shaft.

16. The vent control of claim 15, wherein the panel includes a second slot, and wherein said second slot slideably engages a portion of a fastening element that is attached to said lower section of the outdoor grill.

17. The vent control of claim 16, wherein said first and second slots are parallel.

18. The vent control of claim 17, wherein at least one of said first or second slots are linear.

19. The vent control of claim 14, wherein said second end of said shaft includes a drive member, wherein said panel include a rack, and wherein said drive member and said rack include complementarily shaped interengagable elements.

20. The vent control of claim 14, wherein said panel includes at least one aperture that is substantially the same size and shape of said air inlet aperture of said lower section of the outdoor grill.

\* \* \* \* \*